(No Model.)

G. KNADLER.
PROCESS OF MANUFACTURING CASINGS OR SHEATHS FOR PNEUMATIC TIRES.
No. 525,711. Patented Sept. 11, 1894.

Witnesses
Cornelia A. Skinkle
[signature]

Inventor
Godfred Knadler
By his Attorney
Wm A. Skinkle

UNITED STATES PATENT OFFICE.

GODFRED KNADLER, OF CLEVELAND, OHIO.

PROCESS OF MANUFACTURING CASINGS OR SHEATHS FOR PNEUMATIC TIRES.

SPECIFICATION forming part of Letters Patent No. 525,711, dated September 11, 1894.

Application filed November 17, 1893. Serial No. 491,280. (No model.)

*To all whom it may concern:*

Be it known that I, GODFRED KNADLER, a citizen of the United States, residing at Cleveland, in the county of Cuyahoga and State of Ohio, have invented certain new and useful Improvements in Processes of Manufacturing Casings or Sheaths for Pneumatic Tires, &c., of which the following is a specification, that will enable others skilled in the art to which my invention pertains to make and use the same.

My invention relates to improvements in the manufacture of rubber casings or sheaths for pneumatic tires and other like articles.

It consists in certain improvements in the process of making such articles. Its objects are to expedite and cheapen the process of making goods of this class.

Figure 1:
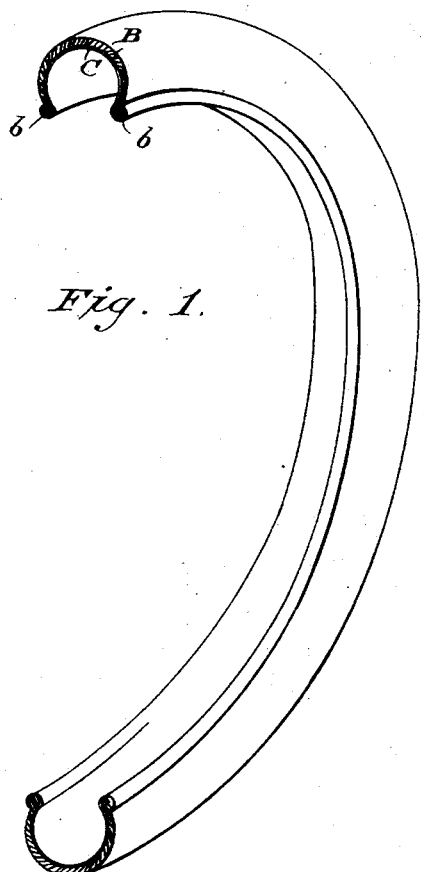
Figure 2:
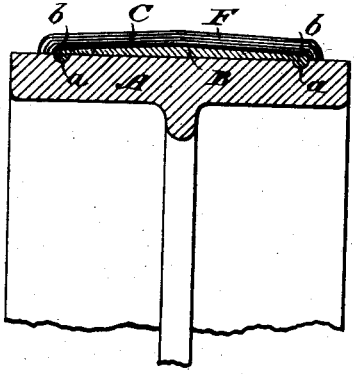
Figure 3:
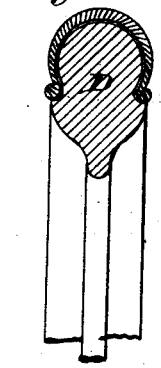
Figure 4:
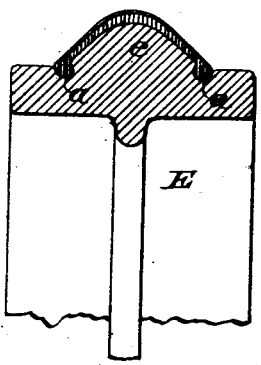
Figure 5:
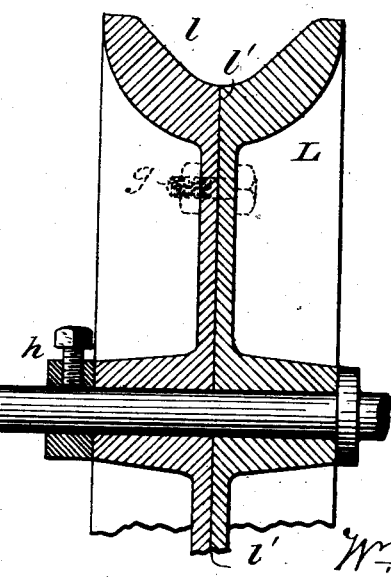

In the accompanying drawings which show my invention Figure 1, is a perspective view of a half section of a pneumatic tire sheath. Fig. 2, is a view in sectional elevation of a flat faced pulley upon which the sheath shown in Fig. 1, may be partially formed by a process upon which my invention is an improvement. Fig. 3, represents in sectional elevation a forming mandrel upon which the partially made tire of Fig. 2 is completed. Fig. 4, shows my improved tire pulley. Fig. 5, is a modification thereof, and Fig. 6, a modified form of sheath which the pulley shown in Fig. 5, is specially adapted to make as will be hereinafter described.

For purposes of illustration let it be supposed that it is desired to make a tire casing or sheath which when in use on a wheel, will be of the shape shown by the half section, Fig. 1. Several processes have heretofore been practiced in the maufacture of such sheaths or casings, one of the principal ones being to form up the casings on mandrel rings or formers on which they are inclosed in suitable flasks or molds and subjected under pressure to the vulcanizing process. The results obtained by this process, however, are not satisfactory. It is so slow that but few casings per day (only about eight or ten) can be produced from a set of the mechanism which consists of a mandrel and divided mold. In a factory therefore, where thousands of sheaths are being made each year a very large number of sets of mechanism must be provided. The uniformity and accuracy of the goods produced by this process is entirely dependent upon the accuracy and fine fitting of the mandrel and mold and the best of workmanship and materials must therefore be employed in their production, making the tool outfit of a large factory for this process an exceedingly costly one.

A further objection to it lies in the fact that the molds are inserted in the vulcanizing press in a horizontal position with the weight of the heavy mandrel resting upon the rubber which is soft and plastic previous to vulcanization. The excess of pressure caused by the weight of the mandrel has a tendency to displace the rubber from the lower side of the sheath and make the finished sheath thinner on that side than on the other.

A further objection lies in the fact that any change in the tire however slight is liable to render useless an entire set of expensive molds.

For these reasons mainly, many manufacturers do not like this process and prefer instead of it to practice what is known as the pulley process, the outfit for which is comparatively simple and inexpensive and the operation quickly and cheaply performed.

I will describe this process somewhat minutely as my invention lies in this direction or in fact, is an improvement thereon.

The sheath is first formed upon the face of a flat pulley like that shown at A, in Fig. 2, the sheet or sheets of rubber B, being first laid upon the face of the pulley and upon this is laid strips C, of canvas or some suitable fabric which constitute the reinforcing lining of the finished sheath. If the edge of the sheath is to be provided with ribs or beads *b*, the pulley will have corresponding grooves *a*, cut in its face for the formation of these ribs.

When the rubber and canvas are properly laid upon the face of the pulley they are covered by a strip of cloth F, wound very tightly and in many layers to completely cover the canvas and rubber and force them radially upon the face of the pulley with a considerable pressure. When in this condition the pulley is transferred to a heating chamber where the sheath is partially vulcanized, not enough however, to give the rubber its permanent shape and set. It is then withdrawn, the partially made sheath removed from it and turned inside out, that is, with rubber outside and canvas inside and then applied to a shaping ring or mandrel D, Fig. 3, upon which it is firmly secured as shown in said figure by winding with strips of cloth or any other suitable method.

It will be observed that the outside diameter of this shaping mandrel is greater than that of the pulley on which the sheath is partially formed and that that portion of the sheath which embraces this larger diameter and which constitutes the tread must be stretched to fit thereon, it being easier to stretch the tread over this larger diameter than to compress the edges into a smaller one. When the sheath has been properly secured to this shaping mandrel it is again placed in the heating chamber and the process of vulcanization completed, during which the sheath acquires its permanent shape. It will be seen that by this process the sheath is partially formed and vulcanized on a flat faced pulley. It is then removed, reversed and transferred to and stretched over a shaping mandrel upon which it is secured and the process of vulcanization and shaping completed.

In the practice of my invention I propose to lay up, shape, vulcanize and complete the sheath in every respect upon the first pulley, eliminating from the process the interruption in the vulcanization, the removal of the sheath from the pulley to a shaping mandrel and securing it on the latter, and the necessity for this second piece of mechanism. In order to accomplish this I construct my pulley E, with its face convexed or crowned up as shown at e, in Fig. 4. This shape or any shape comparatively similar I have found to be all-sufficient to impart to the sheath its permanent form so that it may be constructed, vulcanized, and in every respect completed on my crowned pulley in a single complete operation. If beads are to be formed at the edges of the sheath, suitable grooves a, are cut into the face of the pulley at each side of the crowned portion as shown. The rubber and canvas which constitute the sheath are then laid upon this pulley in the manner described for the flat pulley and similarly bound down or pressed radially against the face of the crown by tight wrappings. The pulley is then put into the hot chamber and left until the rubber is thoroughly vulcanized at which time the sheath is completed and the finished article may be removed from the pulley by simply stretching one of the edges until it passes over the larger diameter of the crown, this being easily accomplished while the sheath is still hot and the canvas more elastic than it normally is when cold. The sheath, it will be observed, is formed and vulcanized completely with its rubber portion against the face of the pulley but when removed therefrom it is reversed or turned inside out, thus bringing the rubber face outside and the canvas lining inside as intended for use.

Figure 6:
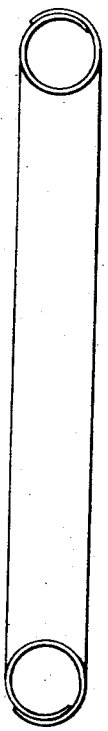

A modification of my pulley particularly applicable to the manufacture of tire sheaths having their openings on the outer or tread side of the tire rather than on the inner or rim side is shown in Fig. 5, in which the pulley L, is formed with a concave grooved face l instead of a convex crowned face, the rubber, canvas, and wrappings being applied in the same order and manner as that previously described and producing when finished a tire casing like the half section shown in Fig. 6.

The substance of my invention lies in forming completely at one operation a tire sheath or other similar semi-cylindrical rubber fabric upon the face of a crowned or grooved pulley on which the central circumferential part of the fabric is of a greater or less diameter than the edges thereof, greater as when made upon a crowned pulley, Fig. 4, and less as when made on a concave grooved pulley, Fig. 5, and many changes might be made in the details of the apparatus and possibly even in the steps of the process itself, all within the skill of a good mechanic and without departing from the spirit of my invention.

The pulley shown in Fig. 5, is split circumferentially as at l', at the bottom of the groove, which construction would enable the removal of the completed sheath from the pulley without stretching, or distorting it in any way to draw a small diameter over a larger one and is decidedly advantageous in this respect. This is effected by separating the sections and removing the sheath from between them.

The two sections may be held together in any suitable way by clamping bolts g, a collar and set screw h, on the shaft H, or any other readily detachable device which will accomplish this purpose.

I prefer to press the rubber and the canvas against the face of the pulley by wrapping strips of cloth tightly thereon as described. This gives it a uniform pressure on all sides which enables me to produce goods of perfectly even thickness but metal clamps or other devices might be employed for this purpose in connection with my pulleys either crowned or grooved and still I think, be within the limits of my invention.

Having thus described my invention, what I claim as new and useful, and desire to secure by Letters Patent, is—

1. The process, substantially as hereinbefore described, of forming and completing at one operation a tire sheath or similar article by laying upon a pulley whose central circumferential diameter is different from the diameter of its edges, layers of plastic rubber and canvas pressing them firmly against the face of the pulley by means of devices which exert pressure in radial directions and while in this condition subjecting them to the process of vulcanization, substantially as and for the purpose hereinbefore set forth.

2. The process, substantially as hereinbefore described, of forming and completing at one operation a tire sheath or similar article consisting of laying upon the face of a pulley whose central circumferential diameter is different from that of its edges, plastic rubber, then upon the rubber a reinforcing fabric, then pressing them firmly against the face of the pulley by wrappings of tightly drawn cloth or flexible fabric and in this condition subjecting them to the process of vulcanization.

3. The process substantially as hereinbefore described, whereby a tire sheath may with its ultimate outer face inside be completely formed and vulcanized upon the face of a pulley whose central circumferential diameter is different from the diameter of its edges and reversing or turning it inside out after its completion and removal from the pulley.

4. The process of making a tire sheath or similar article having a finished exterior surface of rubber upon a single mold or mandrel consisting in forming and vulcanizing said article inside out upon the mold and reversing it when removed therefrom, substantially as set forth.

In testimony whereof I affix my signature, in the presence of two witnesses, at Cleveland, Ohio, November 4, 1893.

GODFRED KNADLER.

Witnesses:
WM. A. SKINKLE,
CORNELIA A. SKINKLE.